Feb. 24, 1942.   W. J. PEETS ET AL   2,274,457
CLUTCH AND BRAKE MECHANISM
Filed Sept. 26, 1939   4 Sheets-Sheet 2

Inventors
Wilbur J. Peets
and John Roll
By Henry J. Miller
Attorney

Witness:
Godfrey Pecina

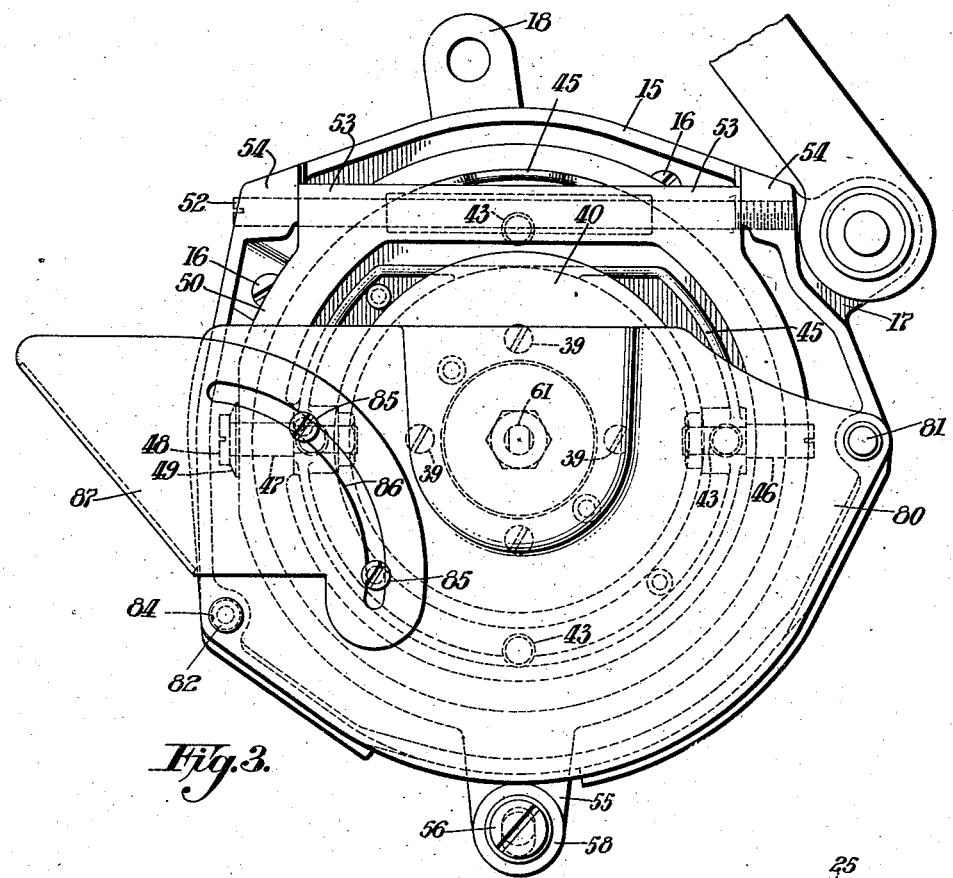
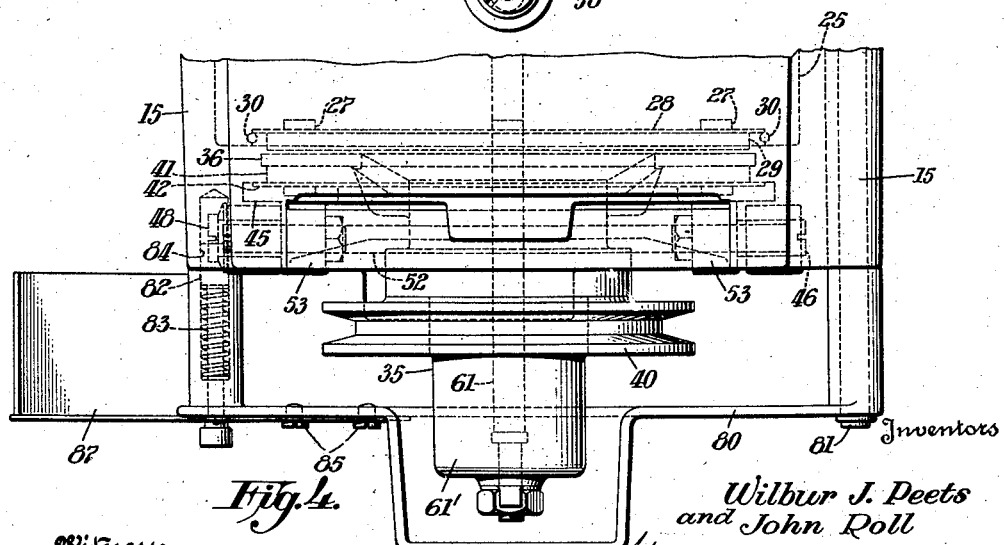

Feb. 24, 1942.  W. J. PEETS ET AL  2,274,457
CLUTCH AND BRAKE MECHANISM
Filed Sept. 26, 1939  4 Sheets-Sheet 4

Inventors
Wilbur J. Peets
and John Roll

Witness:
Godfrey Peeing

By Henry J. Miller
Attorney

Patented Feb. 24, 1942

2,274,457

UNITED STATES PATENT OFFICE 2,274,457

CLUTCH AND BRAKE MECHANISM

Wilbur J. Peets, Elizabeth, and John Roll, Union, N. J., assignors to The Singer Manufacturing Company, Elizabeth, N. J., a corporation of New Jersey Application September 26, 1939, Serial No. 296,598

9 Claims. (Cl. 192—18)

This invention relates to driving devices and more particularly to a combined motor and clutch which is particularly adaptable for driving sewing machines and the like where quick starting and stopping of the machine is essential.

One of the objects of this invention is to produce a smooth and gradual acceleration of the driven clutch element when it is brought into engagement with the driven element.

Another object of this invention is the provision of improved means for adjusting the brake-element and to provide for ready removal and replacement of the friction elements.

A further object is to provide a transmitter which is compact, easily lubricated and which requires a minimum amount of attention to maintain it in efficient operation.

A still further object is to provide improved means for shifting the driven clutch element into engagement with either the driving clutch element or the brake.

With the above and other objects in view, as will hereinafter appear, the invention comprises the devices, combinations, and arrangements of parts hereinafter set forth and illustrated in the accompanying drawings of a preferred embodiment of the invention, from which the several features of the invention and the advantages attained thereby will be readily understood by those skilled in the art.

In the accompanying drawings:

Figure 3 is an end elevation of the transmitter looking from the right of Figure 1.

Figure 4 is a top plan view of the right end of the transmitter.

Figure 1:
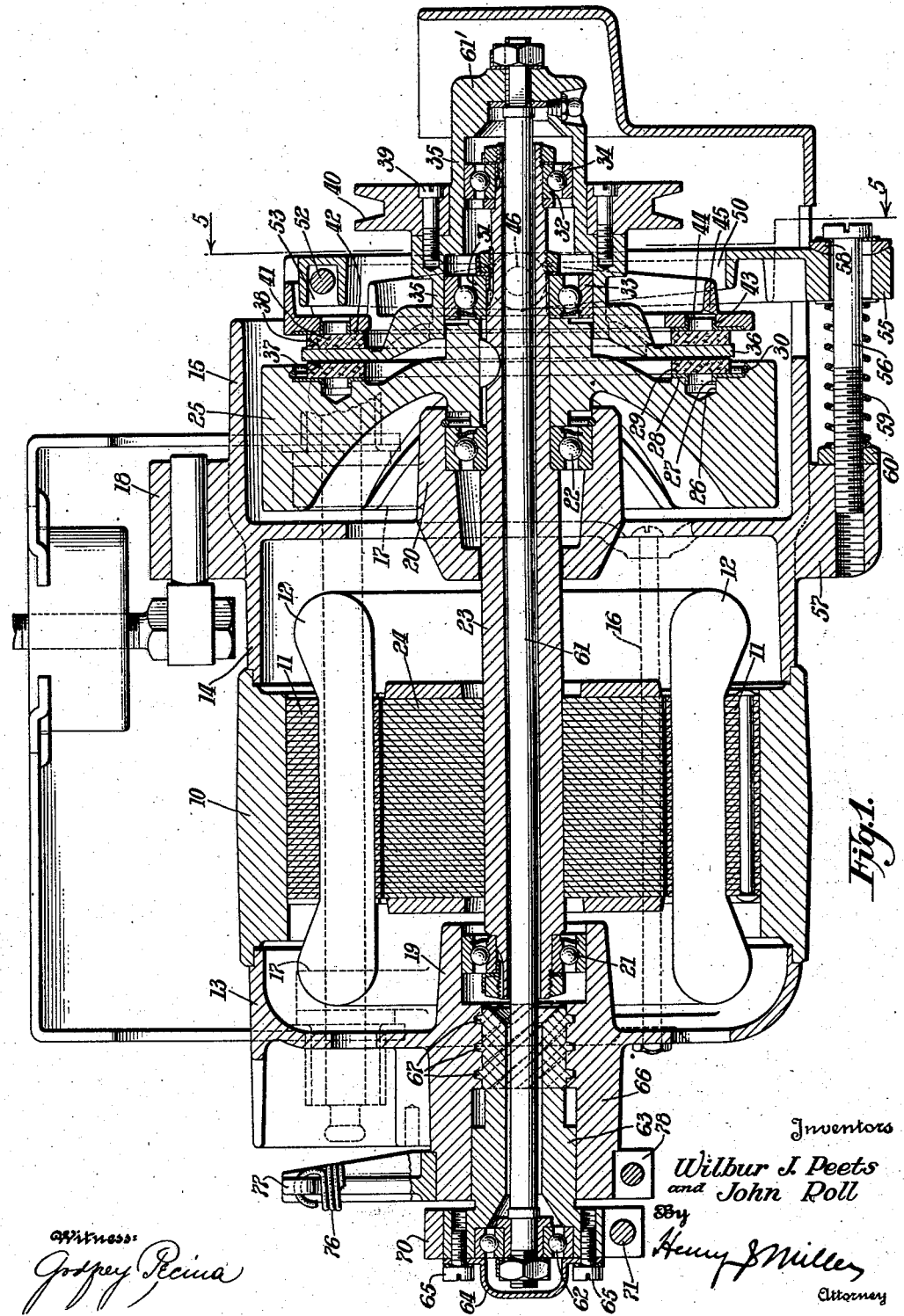
Figure 1 is a vertical section taken through the center of the transmitter.

In the embodiment of this invention selected for illustration, the frame of the transmitter unit is of hollow cylindrical form and comprises a motor field-frame section 10 having the usual field-core 11 carrying exciting windings 12. The field-frame section 10 is closed at one end by an end-bonnet 13, and the other end is closed by an end-bonnet 14 formed with a laterally extending flange 15 which forms a housing for the clutch. The end-bonnets 13 and 14 are rigidly clamped to the field-frame by the bolts 16.

The end-bonnets are each formed with a lug 17 and the end-bonnet 14 is also formed with a lug 18 for the purpose of pivotally and adjustably mounting the transmitter below a table top or the like. For a detailed description of the mounting means reference may be had to the copending application of W. J. Peets, Serial No. 245,917, filed Dec. 15, 1938.

Carried by the supports 19 and 20 in the end-bonnets 13 and 14 are ball-bearings 21 and 22 in which is journaled the hollow motor-shaft 23. One end of the shaft 23 extends into the clutch housing and fixed to it at a point intermediate the bearings 21 and 22 is a rotor 24 which may be of the ordinary squirrel-cage induction type. Keyed to the shaft 23 adjacent the bearing 22 is a flywheel 25 formed with a plurality of shallow holes 26 which receive the struck out portions 27 of a circular metal ring 28 having a cork friction ring 29 cemented to it, and which is held in position by the split spring ring 30. The spring ring 30 is spaced a slight distance from the ring 28 to permit a slight lateral movement of the ring 28 relative to the flywheel 25.

Fixed to and carried by the shaft 23 are spaced ball-bearings 31 and 32 having outer race-rings 33 and 34. Slidably mounted on the outer periphery of the race-rings 33 and 34 is the cup-shaped hub 35 of the driven clutch-disk 36 which is formed with smooth opposed faces 37 and 38 and has secured to it by the screws 39 a grooved belt-pulley 40. The driven clutch element 36 is adapted to be moved endwise so that the smooth face 37 cooperates with the friction ring 29 to drive the pulley 40, and the smooth face 38 is adapted to engage the friction-brake element 41 which is cemented to a metal ring 42. The ring 42 has struck out portions 43 which enter holes 44 in the brake holder 45 to prevent the ring 42 from turning relative to its holder 45. The brake ring 42 is identical with the ring 28 and may be held against lateral movement by rivets or any other suitable means.

The holder 45 is pivotally supported on an adjustable ring 50 by the diametrically opposite pins 46 and 47. The pin 47 is formed with a head 48 against which a cup-shaped washer 49 reacts to provide friction so as to prevent the holder from moving about its pivots except by the application of force.

The ring 50 is pivotally secured to the lateral flange 15 of the end-bonnet 14 by a hinge-pin 52, which extends through the ears 53 on the ring 50 and into the lugs 54 formed on the flange 15. On the side of the ring 50 opposite its hinge there is formed a downwardly extending portion 55 apertured to receive a screw 56 which is threaded into a lug 57 formed on the end-bonnet 14. The head of the screw 56 bears against a curved washer 58, and a coiled spring 59 reacts against the lock-nut 60 and the depending portion 55 for the purpose of constantly urging the portion 55 against the head of the screw 56.

To move the driven clutch element 36 endwise, a rod 61 is provided which extends through the longitudinal bore in the shaft 23 and has one of its ends fixed to the end 61' of the cup-shaped hub 35 and its other end fixed to the inner race member of a ball-bearing 62. The outer race of the bearing 62 is clamped to one end of a sleeve 63 by means of the cover-plate 64 and screws 65. The sleeve 63 extends into the boss 66, formed on the end-bonnet 13, and is formed with threads 67 which cooperate with complemental threads formed in the boss 66. As shown in Figure 1, the threads are of the multiple type so that a slight turning movement of the sleeve 63 will cause the sleeve to move endwise and actuate the clutch.

The sleeve 63 is turned by means of a lever 69 having a split hub 70 which is clamped to the sleeve by the screw 71. The lever 69 is operatively connected to the usual treadle by the rod 72, vibration-absorbing spring 73, and the universally moveable element 74 which extends into the lever 69 and is held therein by the collar 75. It will be observed that the sleeve 63 has a bearing in the boss 66 which takes the pull or thrust of the lever 69.

Figure 2:
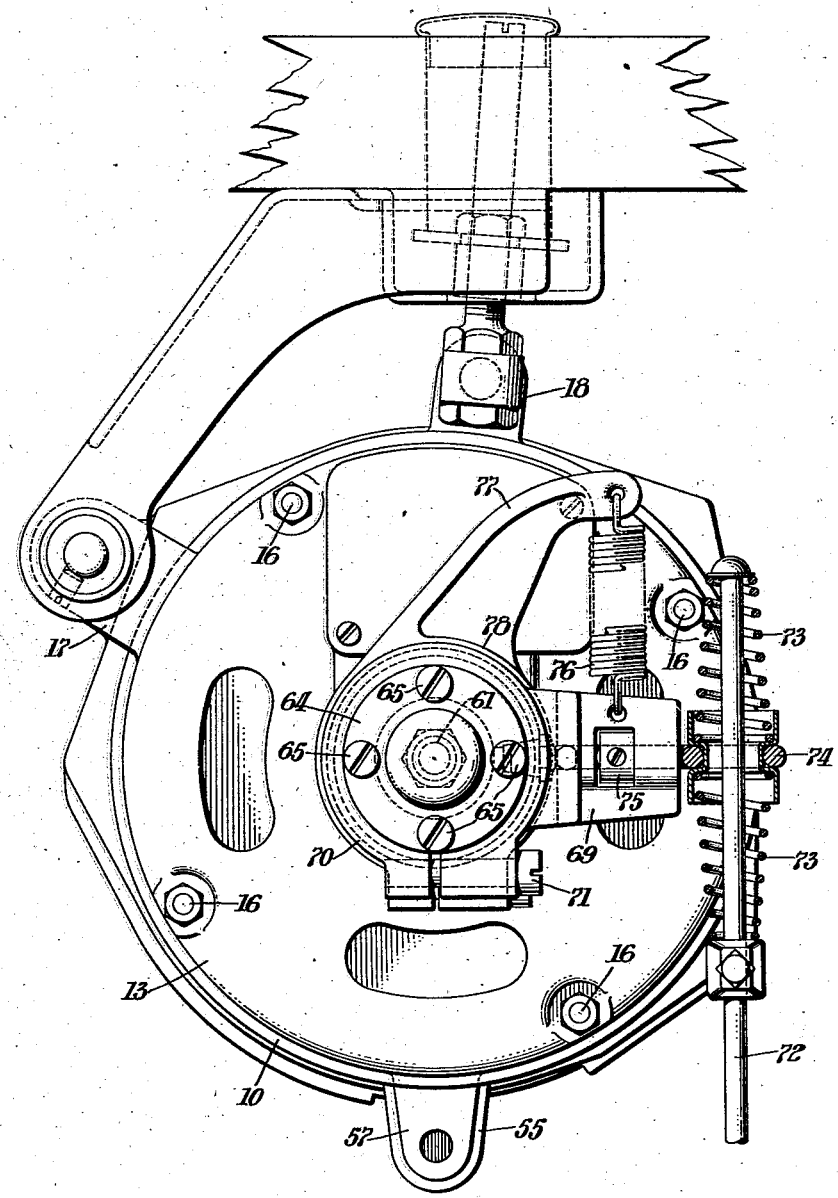
Figure 2 is an end elevation of the transmitter, looking from the left of Figure 1 and showing it mounted beneath a table top.
Figure 5:
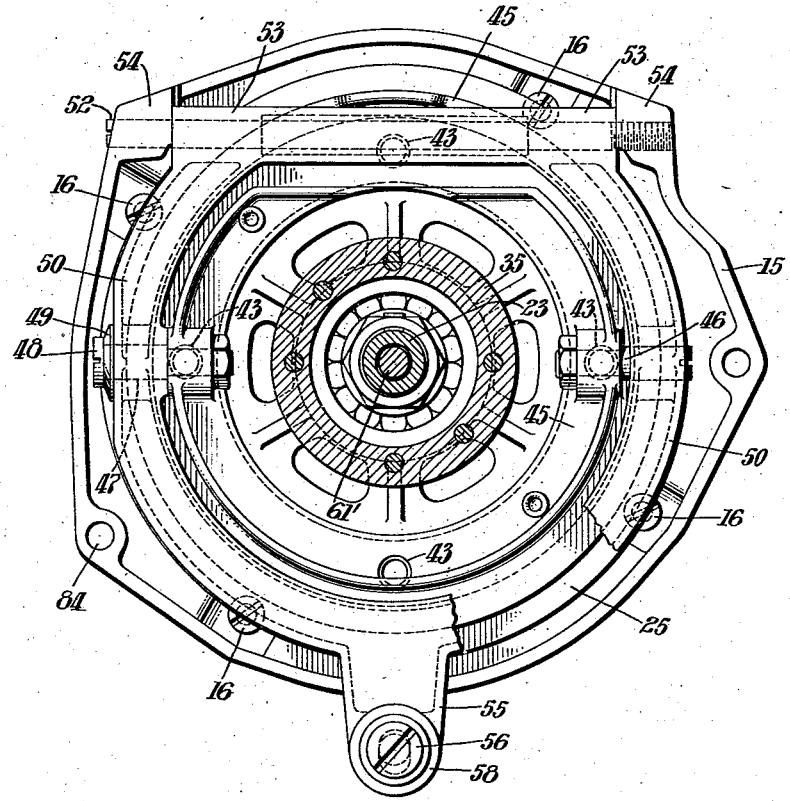
Figure 5 is a sectional view taken substantially along the line 5—5 of Figure 1.

In order to automatically apply the brake when the operator's feet are removed from the treadle, a spring 76 is provided. This spring has one of its ends connected to the operating lever 69 and its other end connected to an arm 77 having a split hub 78 which is clamped around the annular boss 66. (Figs. 1 and 2.) The transmitter is adapted to be mounted in various angular positions about its longitudinal axis and the operating lever 69 and arm 77 may be changed to any angular position by unclamping the split hubs and shifting them relative to the sleeve 63 and the hub 66.

Figure 6:
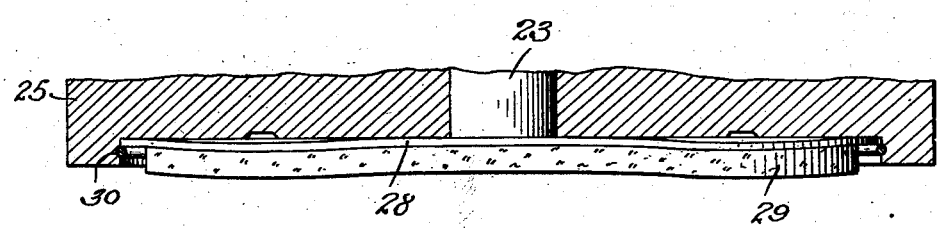
Figure 6 is an enlarged detailed view, the flywheel being shown in section and the friction ring in elevation.

The operation of the transmitter is as follows: when the treadle is depressed the rod 72 moves the lever 69 against the action of the spring 76. This movement of the lever 69 causes the sleeve 63 to turn about its longitudinal axis and, due to the pitch of the multiple threads 67, this turning movement causes the sleeve 63 to move longitudinally. This longitudinal movement of the sleeve, through the ball-bearing 62 and rod 61, causes the driven clutch element to move to the left, as shown in Figure 1, until its face 37 is in engagement with the friction cork disk 29 carried by the driving element. When the treadle is released, the action is reversed and the face 38 of the driven element is brought into engagement with the friction brake element 41. To produce smooth and gradual acceleration of the driven machine when the driven element 36 is suddenly brought into engagement with the driven clutch element or brake, the sheet metal rings 28 and 42, which are somewhat resilient, are slightly distorted or formed with a wave, as shown exaggerated in Figure 6. With this construction, when the driven element 36 engages either of the cork friction surfaces, the higher points are first engaged and upon continued pressure on the treadle the cork friction ring and sheet metal ring are caused to conform to the seat for the rings at which time the entire surface of the friction ring and driven element are in engagement.

In order to protect the operator, the rotating hub and belt-pulley are covered by a guard 80 which has one of its sides pivoted to a stud 81 fixed to the flange 15 of the end-bonnet 14. The other side of the guard is detachably held on the flange 15 by a plunger 82 which is urged by a spring 83 into a hole 84 in the flange 15. Adjustably secured to the guard 80 by the screws 85 and slot 86 is a belt-guard 87. This arrangement of the guards permits the guard 87 to be adjusted to different angular positions when the angular position of the transmitter is changed.

From the foregoing description it will be apparent that the construction described is susceptible of variations, and, therefore, the privilege is reserved of resorting to all such legitimate changes therein as may be fairly embodied in the spirit and scope of the appended claims.

Having thus set forth the nature of the invention, what we claim herein is:

1. In a transmission unit, the combination of, a housing, a driven clutch element mounted in said housing for lateral movement relative thereto, a brake against which said clutch element is adapted to be moved, a holder for said brake, a ring having one side hinged to the housing, means for pivotally securing said holder to said ring and means for adjusting said ring about its hinge.

2. In a transmission unit in combination, a housing, a driven clutch element carried by and movable endwise of the housing, a ring hinged to said housing, means for adjusting said ring about its hinge, a brake element pivotally secured to said ring and manually controlled means for forcing said driven element into engagement with said brake.

3. In an electric motor and clutch transmission unit, a tubular housing for enclosing the unit, a ring formed with a depending portion and hinged to one end of the housing, a screw extending through said depending portion and screw-threaded into a lug formed on said housing, and a brake element pivoted to said ring at diametrically opposite points.

4. In an electric motor and clutch transmission unit, a tubular housing for enclosing the unit, a ring formed with ears and a depending portion, a hinge-pin fixed to said housing and passing through said ears, adjustable means connecting the depending portion of said ring with said housing, a brake and pivot-pins for pivotally connecting said brake to the ring, said pins being arranged on diametrically opposite sides of said ring and parallel to said hinge-pin.

5. In a transmission unit, a motor with a rotating shaft, a driving element fixed to said shaft, a driven element, a brake element, friction devices carried by said driving and brake element, respectively, each of said friction devices comprising a resilient metal ring having a wavy surface and a ring of material having a high coefficient of friction secured to said surface.

6. In a transmission unit, a motor having a rotating shaft, a flywheel carried by said shaft and formed with a plurality of holes, a friction element comprising a ring of material having a high coefficient of friction secured to a metal ring, said metal ring having projections which extend into the holes in said flywheel, a spring ring for holding said friction element on said flywheel, a driven element, and means for moving said driven element into engagement with the friction element on the flywheel.

7. In a transmission unit, a housing, a clutch and electric motor mounted in said housing, a ring hinged to said housing, means outside of said housing for adjusting said ring about its hinge, a brake element carried by said ring, a driven element, and means for moving said driven element into engagement with said brake.

8. In a transmission unit, a housing, a clutch and electric motor mounted in said housing, a brake element pivotally mounted in said housing, a driven element, means for adjusting said brake element towards and away from said driven element and a friction device for preventing said brake element from moving about its pivot except by the application of force.

9. In a transmission unit, a housing, a clutch and electric motor located within said housing, a ring hinged to said housing at points adjacent the outer periphery of the ring, means located diametrically opposite the hinge and outside the housing for adjusting said ring about its hinge, a brake element carried by said ring, a driving element actuated by said motor, a driven element, and means for moving the driven element into engagement with either the driving element or the brake element.

WILBUR J. PEETS.
JOHN ROLL.